(12) United States Patent
Spackman (10) Patent No.: US 8,621,645 B1
(45) Date of Patent: Dec. 31, 2013

(54) PROVIDING INFORMATION BASED ON CONTEXT (75) Inventor: Stephen Philip Spackman, San Jose, CA (US)

(73) Assignee: Google Inc., Mountain View, CA (US)

( * ) Notice: Subject to any disclaimer, the term of this patent is extended or adjusted under 35 U.S.C. 154(b) by 11 days.

(21) Appl. No.: 13/592,892

(22) Filed: Aug. 23, 2012

(51) Int. Cl.
*G06F 21/00* (2006.01)

(52) U.S. Cl.
USPC ............................................................ 726/26

(58) Field of Classification Search
USPC ...................................................... 726/26–30
See application file for complete search history.

(56) References Cited

U.S. PATENT DOCUMENTS

| 2002/0151272 A1* | 10/2002 | Simon ........................ 455/3.06 |
| 2009/0260075 A1* | 10/2009 | Gedge et al. .................... 726/17 |
| 2011/0219423 A1* | 9/2011 | Aad et al. ......................... 726/1 |

* cited by examiner

*Primary Examiner* — Lisa Lewis
(74) *Attorney, Agent, or Firm* — Leydig, Voit & Mayer, Ltd.

(57) ABSTRACT

A method, apparatus, and computer readable medium that receives a request to output content with a computing apparatus in a vehicle. Privacy information associated with the content is identified. Environmental data associated with the vehicle is determined, the environmental data including at least a number of occupants present in the vehicle. At least a portion of the content is modified and/or suppressed based on the privacy information and the environmental data. The modified content and/or any portion of the content not suppressed is output by the computing apparatus in the vehicle.

26 Claims, 3 Drawing Sheets

PROVIDING INFORMATION BASED ON CONTEXT

BACKGROUND

Mobile computing devices, such as smartphones for example, facilitate storage and communication of a significant amount of information. However, mobile computing devices are also increasingly connected to their surroundings, rendering users susceptible to inadvertent or unwanted dissemination of sensitive, confidential, and/or private information. Information is particularly susceptible to such unwanted dissemination in captive environments where output of user information may result in all occupants of the environment obtaining the information.

One such captive environment is a vehicle in which an onboard vehicle computing apparatus can engender such inadvertent disclosure. Many vehicles include onboard computing devices capable of providing information and services to vehicle occupants such as navigation information and information regarding the operation of vehicle systems. Many vehicle computing apparatus are also capable of connecting to an occupant's mobile computing device that is present in the vehicle, such as by an IEEE 802.15 pairing, for example. Once paired, mobile computing devices can be configured to automatically send information regarding incoming calls, calendar appointments, and/or reminders, for example, to the vehicle computing apparatus for output by the vehicle computing apparatus.

However, a user of a mobile computing device may not want confidential, sensitive, and/or private information communicated by the mobile computing device to be visually or audibly output by the vehicle computing apparatus when any other occupants are present in the vehicle. For example, a user of a mobile computing device may not want sensitive business information, such as upcoming customer appointments or incoming customer calls, to be displayed by the vehicle computing apparatus when a passenger associated with a competitor business is present in the vehicle. Accordingly, distribution of some information to or by a vehicle computing apparatus may be undesirable depending on the context.

SUMMARY

A method includes receiving, by a computing apparatus in a vehicle and from a mobile computing device, a request to output content. Privacy information associated with the content is identified by the computing apparatus. Environmental data associated with the vehicle, and including at least a number of occupants present in the vehicle, is determined by the computing apparatus. The content is modified, by the computing apparatus, based on the privacy information and the environmental data. The modified content is output, by the computing apparatus.

A non-transitory computer readable medium having stored thereon instructions comprising machine executable code which, when executed by at least one processor, causes the processor to perform steps including receiving, from a mobile computing device, a request to output content. Privacy information associated with the content is identified. Environmental data associated with a vehicle, and including at least a number of occupants present in the vehicle, is determined. At least a portion of the content is suppressed based on the privacy information and the environmental data.

A method includes generating, by a mobile computing device, a request to output content with a computing apparatus in a vehicle. Privacy information associated with the content is identified by the mobile computing device. Environmental data associated with the vehicle, and including at least a number of occupants present in the vehicle, is determined by the mobile computing device. The content is modified, by the mobile computing device, based on the privacy information and the environmental data. The request including the modified content is sent, with the mobile computing device, to the computing apparatus in the vehicle.

An apparatus includes a processor coupled to a memory and configured to execute programmed instructions stored in the memory including generating a request to output content with a computing apparatus in a vehicle. Privacy information associated with the content is identified. Environmental data associated with the vehicle, and including at least a number of occupants present in the vehicle, is determined. At least a portion of the content is suppressed based on the privacy information and the environmental data. The request including any portion of the content not suppressed is sent to the computing apparatus in the vehicle.

This technology provides a number of advantages including context-aware suppression and/or modification of information to be output by a vehicle computing apparatus. In particular, this technology analyzes the information to be output to determine privacy characteristics of the information as well as the environment of the vehicle to determine information regarding occupants of the vehicle. Based on the environmental data, a mobile computing device configured to send the information, and/or vehicle computing apparatus configured to receive and output the information, can modify and/or suppress one or more portions of the information, for example, to restrict the output of the information consistent with the privacy characteristics.

DETAILED DESCRIPTION

Figure 1:
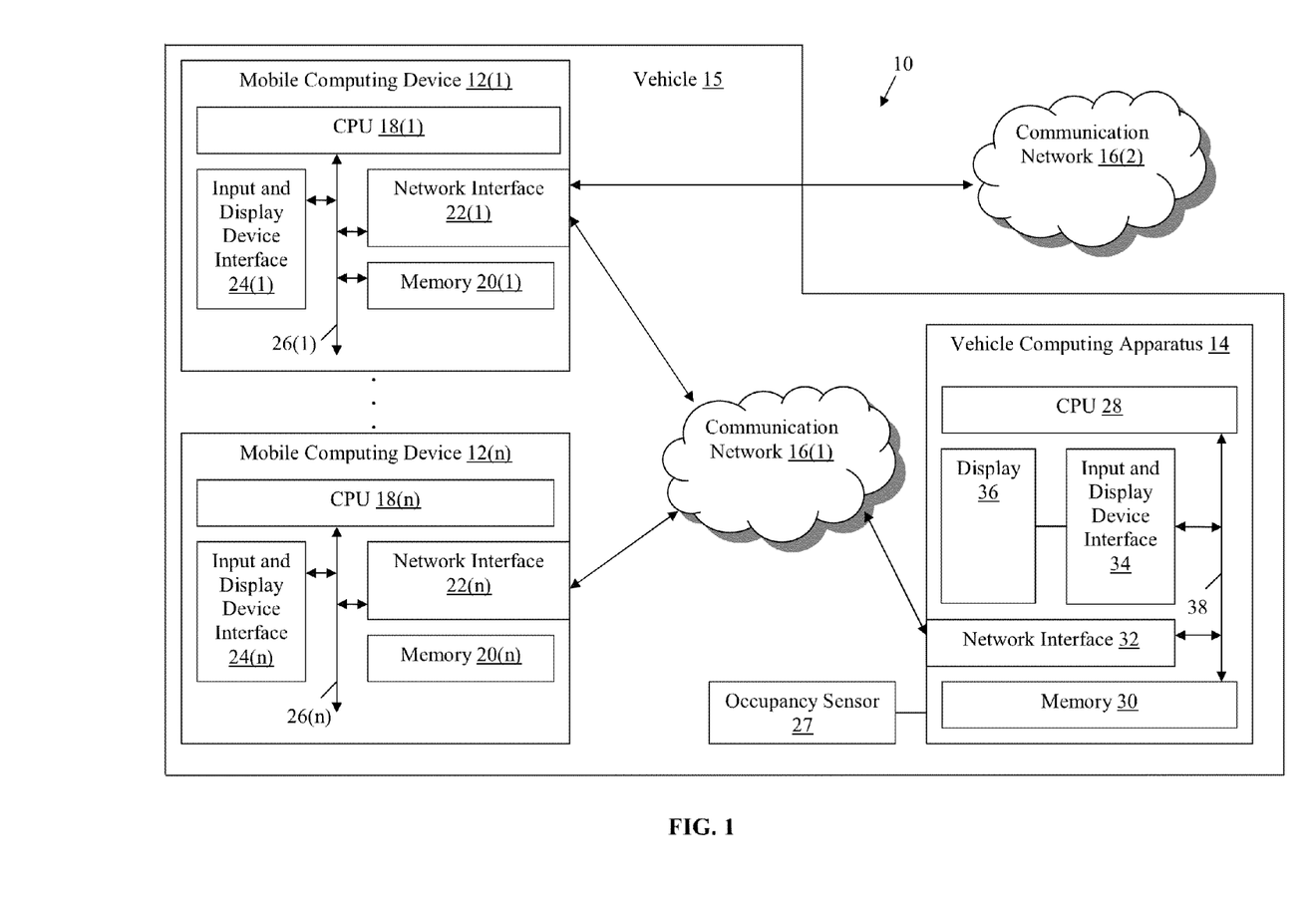
FIG. 1 is a block diagram of an environment with mobile computing devices and a computing apparatus disposed in a vehicle and configured to communicate with the mobile computing devices by a communication network.

An environment 10 that may include mobile computing devices 12(1)-12(n) configured to communicate with a vehicle computing apparatus 14 in a vehicle 15 is illustrated in FIG. 1. More specifically, the environment 10 may include the mobile computing devices 12(1)-12(n), a computing apparatus 14 of a vehicle 15, and communication networks 16(1)-16(n), although other numbers and types of systems, devices, and/or elements in other configurations and environments with other communication network topologies can be used. This technology provides a number of advantages including methods, non-transitory computer readable storage medium, and devices that selectively provide confidential or private information, such as in a captive environment, based on context information associated with the environment.

The mobile computing devices 12(1)-12(n) can be the same or different type of device of any of a variety of different communication devices, such as a smartphone, tablet computer, wireless telephone, laptop computer, PDA, Wi-Fi phone, or GPS navigation device by way of example only. In one example, the mobile computing devices 12(1)-12(n) may include a central processing unit (CPU) or processor 18(1)-18(n), a memory 20(1)-20(n), a network interface 22(1)-22(n), and an input and display interface 24(1)-24(n), optionally coupled to an input and/or display device (not shown), which may be coupled together by a bus 26(1)-26(n) or other link. In other examples, the mobile computing devices 12(1)-12(n) can include other numbers and types of components, devices, systems, and elements in other configurations. The processors 20(1)-20(n) may execute a program of stored instructions for one or more aspects of the present invention as described and illustrated herein, although the processor could execute other numbers and types of programmed instructions.

The memory 20(1)-20(1) may store these programmed instructions for one or more aspects of the present invention as described and illustrated with the examples herein, although some or all of the programmed instructions could be stored and/or executed elsewhere. A variety of different types of memory storage devices could be used for the memory 20(1)-20(n) such as for example, a random access memory (RAM), read only memory (ROM), floppy disk, hard disk, CD ROM, or other computer readable medium which may be read from and/or written to by a magnetic, optical, or other reading and/or writing system coupled to the processor 18(1)-18(n).

The network interfaces 22(1)-22(n) in the mobile computing devices 12(1)-12(n) may be used to operatively couple and communicate between the mobile computing devices 12(1)-12(n) and the computing apparatus 14 of the vehicle 15 over the communication network 16(1), respectively, although other types and numbers of communication networks with other types and numbers of connections and configurations can be used. The communication network 16(1) can be based on an IEEE 802.15 or Bluetooth connection and/or an IEEE 802.11 WiFi connection, for example, although other connection methods and communication networks can also be used. Additionally, the mobile computing devices 12(1)-12(1) can be configured to communicate with each other using network interfaces 22(1)-22(n) and the communication network 16(1) or another communication network. One or more of the network interfaces 22(1)-22(n) can further be configured to communicate with communication network 16(n) which can be a telecommunications network for facilitating voice communications, for example.

The input and display devices 24(1)-24(n) of the mobile computing devices 12(1)-12(n) enable a user to interact with the mobile computing devices 12(1)-12(n), such as to input and/or view data and/or to configure or operate it by way of example only. Input devices may include a keyboard and/or a computer mouse and display devices may include an LED display, although other types and numbers of input devices and display devices can be used including touch pads and touch screens, liquid crystal displays (LCDs) and light emitting diode (LED) displays.

The vehicle computing apparatus 14 may be any computing device capable of communicating with the mobile computing devices 12(1)-12(n) via the communication network 16(1). By way of example only, the vehicle computing apparatus 14 can be an onboard vehicle computer that is in operative communication with various systems of the vehicle 15, although other devices with similar features and capabilities may be used. For example, the vehicle computing device 14 may be in operative communication with an occupancy sensor 27, such as coupled to an airbag safety system, although the vehicle computing device 14 may be in operative communication with various other systems associated with the vehicle 15.

The vehicle computing apparatus 14 may include a central processing unit (CPU) or processor 28, a memory 30, a network interface 32, and an input and display device interface 34 coupled to a display 36, which are coupled together by a bus 38 or other link, although other numbers and types of systems, devices, components, and elements in other configurations and locations can be used. The processor 28 in the vehicle computing apparatus 14 executes a program of stored instructions for one or more aspects of the present technology as described and illustrated by way of examples herein, although other types and numbers of processing devices and logic could be used and the processor 28 could execute other numbers and types of programmed instructions.

The memory 30 in the vehicle computing apparatus 14 may store these programmed instructions for one or more aspects of the present technology as described and illustrated herein, although some or all of the programmed instructions could be stored and executed elsewhere. A variety of different types of memory storage devices could be used for the memory 30 such as for example, a random access memory (RAM), read only memory (ROM), floppy disk, hard disk, CD ROM, or other computer readable medium which may be read from and/or written to by a magnetic, optical, or other reading and/or writing system coupled to the processor 28.

The network interface 32 in the vehicle computing apparatus 14 may be used to establish a connection and communicate between the vehicle computing apparatus 14 and the mobile computing devices 12(1)-12(n) via the communication network 16(1), although other types and numbers of communication networks or systems with other types and numbers of connections and configurations can be used. By way of example only, the network interface 32 may utilize a Bluetooth device to pair and communicate with other devices including one or more of the mobile computing devices 12(1)-12(n), although other interface systems suitable for creating a connection, such as a wireless local area network, personal area network, or a mesh network can be used.

The input and display device 34 of the vehicle computing apparatus 14 enables a user to interact with the vehicle computing apparatus 14, such as to input and/or view data and/or to configure or operate it by way of example only. The input and display device 34 is coupled to a display 36 which can be a capacitive sensing display or touchscreen which is optionally also capable of receiving user input, although other types and numbers of input devices and displays can be used.

Although embodiments of the mobile computing devices 12(1)-12(n) and the computing apparatus 14 of the vehicle 15, are described and illustrated herein, the mobile computing devices 12(1)-12(n) and vehicle computing apparatus 14, can be implemented on any suitable computer system or computing device. It is to be understood that the devices and systems of the embodiments described herein are for illustration purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those of ordinary skill in the art. In addition, the embodiments may also be implemented on computer system(s) that extend across any suitable network using any suitable interface mechanisms and communications technologies.

The embodiments may also be embodied as non-transitory computer readable medium or storage devices having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 2:
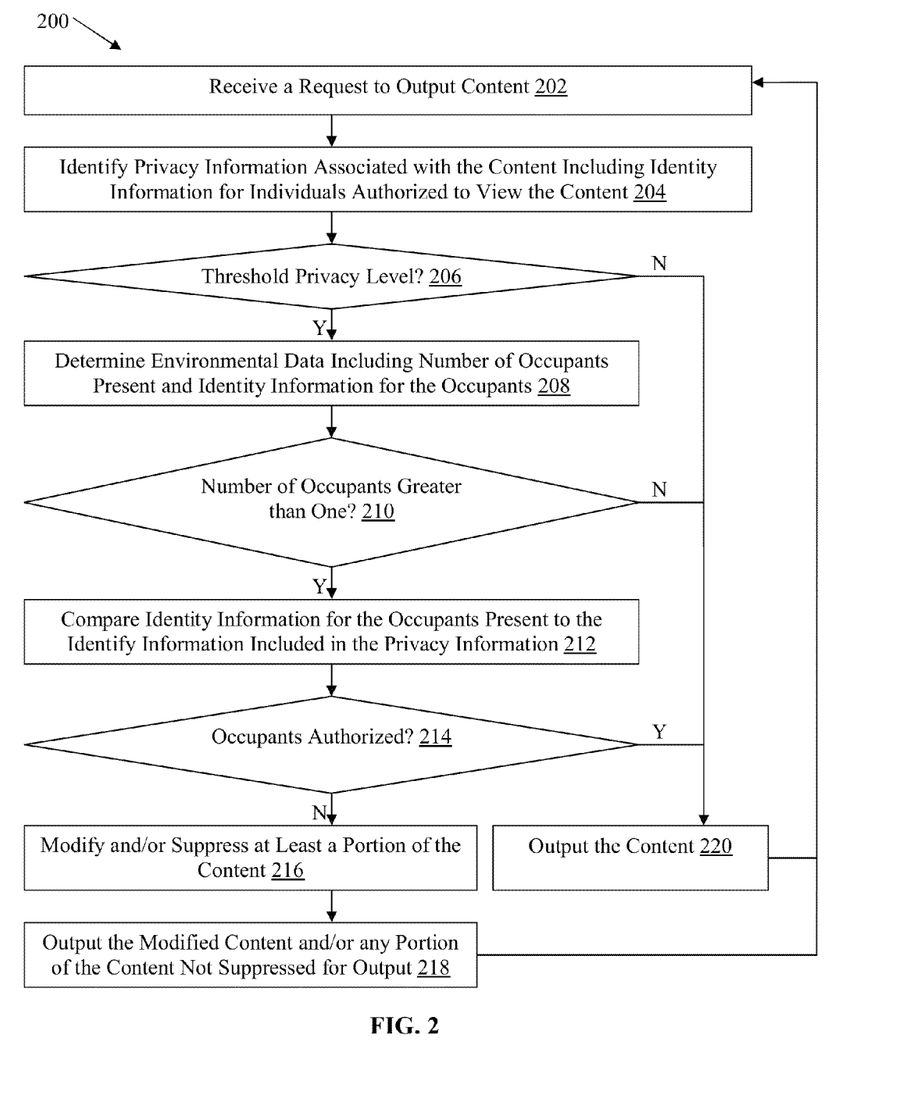
FIG. 2 is a flow chart of a method for modifying and/or suppressing content by a vehicle computing apparatus prior to output by the vehicle computing apparatus.

A method 200 for modifying and/or suppressing content by the vehicle computing apparatus 14 prior to output by the vehicle computing apparatus 14 will now be described with reference to FIGS. 1-2. In step 202, the vehicle computing apparatus 14 receives a request from a mobile computing device 12(1) to output content, such as a request to display content or a request to emit audible content, for example. The request can be generated automatically by a computer program operating on the mobile computing device 12(1) in response to an event and based on one or more rules, as described in more detail below with respect to step 302. The content can be information regarding an incoming call received from communication network 16(2), a notification of an upcoming appointment, address book or contact information, and/or navigation or location information, although any other type of information or content can also be included in the request. The request can be sent by the mobile computing device 12(1), and received by the vehicle computing apparatus 14, using an established communication link over the communication network 16(1).

In one example, the mobile computing device 12(1) and the vehicle computing apparatus 14 can establish a communication link over the communication network 16(1) using IEEE 802.15 Bluetooth technology. In this example, a user may couple the mobile computing device 12(1) with the vehicle computing apparatus 14 by accessing a Bluetooth menu of the mobile computing device 12(1). The user can activate the Bluetooth signal by putting the mobile computing device 12 in a discovery mode. The user can then enable the Bluetooth signal in the vehicle computing apparatus 14 and select the name of the device that the user wants to pair to the mobile computing device 12(1). The mobile computing device 12(1) may then initiate a search for any discoverable devices.

Once the vehicle computing apparatus 14 discovers the mobile computing device 12(1), a password or pin number can be provided. The user may enter the pin number into the mobile computing device 12(1) and wait for the devices to finish pairing. Once paired, each device can store the connection characteristics of the communication link to be used whenever the mobile computing device 12(1) is within a range of the vehicle computing apparatus 14. Other types of wireless and/or wired technologies can be used to establish the communication link such as wireless LAN systems, infrared technology, radio frequency, DLP-Link, and dedicated short range communications (DSRC) systems, or the like.

In step 204, the vehicle computing apparatus 14 identifies privacy information associated with the content included in the request received in step 202. The privacy information can include user preference information for treatment of content (e.g. modify or suppress at least a portion of the content prior to outputting the content) based on one or more characteristics of the content and/or request. Characteristics can include the type of content (e.g. incoming call or calendar reminder), content attributes (e.g. work-related or personal), the type of mobile computing device 12(1) from which the request was received, the communication link used to communicate the request, and/or the user associated with the mobile computing device 12(1) from which the request was received, although other characteristics can also be used.

Optionally, the preference information and/or treatments can be input by the user through an interface output to the display 36 of the vehicle computing apparatus 14 and stored in the memory 30. For example, the vehicle computing apparatus 14 can be configured to display an interface including one or more questions (e.g. "Display work-related appointment reminders?") and receive, through the input and display device interface 34, one or more user preference responses (e.g. "Yes," "No," or "Only when all of the other vehicle occupants are coworkers"), which correspond to treatments of the request (e.g. "Never display work-related appointment reminders"). The vehicle computing apparatus 14 can store the treatment(s) in a table in the memory 30 as associated with one or more characteristic(s) (e.g. "calendar appointment" and "work-related") of the content.

In the method 200, the privacy information optionally includes identity information for individuals authorized to view the content. In one example, the names or unique identifiers of individual(s) authorized to view the content can be retrieved from information included in the request by the mobile computing device 12(1). In another example, the identity information is determined based on user preference information input to and stored by the vehicle computing apparatus 14. For example, the vehicle computing apparatus 14 can be configured to display an interface including one or more questions (e.g. "Who is authorized to view the name of an incoming caller?") and receive, through the input and display device interface 34, one or more answers (e.g. "Only my spouse"), which correspond to treatments of the request (e.g. "Do not display the name of an incoming caller unless the only other vehicle occupant is my spouse").

Accordingly, in this example, a user of the vehicle computing apparatus 14 can be provided relatively fine-grained control over the occupants authorized to view content having specified characteristics as well as the ability to completely suppress content having other specified characteristics. Other identity information for individuals authorized to view content and methods of identifying the identity information can also be used.

In step 206, the vehicle computing apparatus 14 determines whether the privacy level exceeds a threshold privacy level indicating at least a portion of the content is private and requires modification or suppression. Based on the privacy information, the vehicle computing apparatus 14 can determine a privacy level associated with the content. In one example, a privacy level is assigned by the vehicle computing apparatus 14 to the request based on the treatment included in the identified privacy information. In this example, each treatment is associated with a privacy level. Accordingly, privacy levels can be used to indicate that content is at least partially private, available or not available to only certain specified individual(s) or categories of individuals, and/or available in a modified form with private information filtered, modified, removed, or anonymized, for example. If more than one privacy level is applicable to a request based on the privacy information, the vehicle computing apparatus 14 can optionally assign one of the applicable privacy levels based on a stored ranking of privacy levels such that the most restrictive level is assigned. If, based on the privacy information or lack thereof, the content does not require modification or suppression, a default privacy level can be assigned indicating the information is public. In this example, any privacy level other than the default privacy level satisfies the threshold privacy level condition of step 206.

In another example, satisfaction of the condition can be determined by the vehicle computing apparatus 14 based on the privacy information and without an explicit assignment of a privacy level to the request. Accordingly, irrespective of whether a privacy level is assigned to the request, the threshold privacy level is exceeded whenever the privacy information indicates a treatment requiring modification or suppression of at least a portion of the content when specified conditions based on the characteristics of the vehicle 15 occupants are met. Other methods of determining privacy levels and/or whether the threshold privacy level is exceeded can also be used. If the vehicle computing apparatus 14 determines the privacy level exceeds a threshold level, the vehicle computing apparatus 14 proceeds to step 208.

In step 208, the vehicle computing apparatus 14 determines environmental data including at least a number of occupants present in the vehicle 15. The number of occupants present in the vehicle 15 can be determined based on communication with an occupancy sensor 27 of the vehicle. The occupancy sensor 27 can be an occupant classification system (OCS) sensor associated with an airbag safety system of the vehicle 15 and disposed proximate to each seating location in the vehicle. In this example, the OCS sensor can include a pressure sensor configured to send a signal to an electronic control unit (ECU) coupled to the pressure sensor when an occupant's weight is registered. The ECU is configured to send information regarding the occupant to a computing apparatus, which can be coupled to or integral with the vehicle computing apparatus 14.

Based on the communication from the ECU, the vehicle computing apparatus 14 can determine that at least one occupant other than the user of the mobile computing device 12(1) is present in the vehicle 15. Optionally, in this example the OCS sensor can obtain occupant characteristics such as weight and position, for example, and classify the occupant based on the characteristics.

Accordingly, the vehicle computing apparatus 14 can optionally ignore, for purposes of the determination of step 208, certain occupants (e.g. small children), or an object occupying a seat in the vehicle 15 that is not classified as a person and does not require activation of the airbag safety system.

In other examples, the occupancy sensor 27 can be a seat pressure sensor not coupled to the an airbag safety system of the vehicle 15, a motion sensor, a biometric sensor, or another mobile computing device 12(n) configured to emit a signal that can be identified by the vehicle computing apparatus 14. Other sensors configured to determine whether a vehicle driver and/or passengers other than the user of the mobile computing device 12(1) are present in the vehicle 15 can also be used.

In the method 200, the vehicle computing apparatus 14 optionally determines identity information for at least one other occupant such as based on information communicated by a mobile computing device 12(n) associated with the other occupant, for example. The mobile computing device 12(n) can be an electronic key configured to transmit a signal to the vehicle computing apparatus 14. The signal and electronic key information can be associated in the memory 30 with occupant identity information based on information previously input by a user of the vehicle computing apparatus 14 (e.g. such that the occupant identity information indicates a spouse whenever the electronic key is present in the vehicle 15).

In another example, the mobile computing device 12(n) can include a network interface 22(n) configured to send and receive information using the communication network 16(1). In this example, the vehicle computing apparatus 14 can communicate with the mobile computing device 12(n) to obtain identity information and/or information associated with the mobile computing device 12(n) that can be used to query a database stored in the memory 30, or an external network-accessible device, to obtain the occupant identity information. The external network-accessible device can be a remote corporate server accessible by a wireless network connection using the network interface 32, for example, although other types and numbers of devices can be queried synchronously or asynchronously. Information obtained from the external network-accessible device can be stored in local memory 30 for subsequent comparison or retrieval. Instead of or in addition to determining individual occupant identity information, the vehicle computing apparatus 14 can determine a category of identity information associated with the occupant (e.g. "coworker") based on the information obtained from the mobile computing device 12(n) using the communication network 16(1), such as connection information for a common enterprise network. In these examples, the mobile computing device 12(n) can be a smartphone or a smart badge, for example.

In yet another example, the occupant identity information can be obtained from a biometric sensor disposed in the vehicle 15 and coupled to the vehicle computing apparatus 14. In this example, an information capture by the biometric sensor can be used to query a database stored in the memory 30, or an external network-accessible device, storing previous capture, calibration, or any other information associated with an occupant identity. Accordingly, the vehicle computing apparatus 14 can determine whether there are other occupants in the vehicle as well as more specific identity information such as a unique identifier (e.g. name, username, credentials, or an e-mail address) or an indication of a category of individuals to which one or more of the occupants present in the vehicle 15 belong.

In step 210, the vehicle computing apparatus 14 determines whether the number of occupants present in the vehicle 14 is greater than one based on the determined environmental data. If the number of occupants present in the vehicle 15 is greater than one, the vehicle computing apparatus 14 proceeds to step 212.

In step 212, the vehicle computing apparatus 14 optionally compares the occupant identity information included in the environmental data determined in step 208 to the identity information for the individuals authorized to view the content included in the privacy information identified in step 204. Based on the comparison, in step 214, the vehicle computing apparatus 14 determines whether the occupant(s) present in the vehicle 15 are authorized to view the content. If at least one of the occupant(s) present in the vehicle 15 is not authorized to view at least a portion of the content, the vehicle computing apparatus 14 proceeds to step 216.

Optionally, the vehicle computing apparatus 14 can proceed directly to step 216 from step 210 in examples in which identity information is not determined and/or included in the privacy information and/or occupant identity information is not determined and/or included in the environmental data in which case other occupants can be considered untrusted by default. Additionally, the vehicle computing apparatus 14 can proceed directly to step 216 from step 210 in examples in which a privacy level is assigned indicating that at least a portion of the content is private such that no other individuals are authorized to view the content.

In step 216, the vehicle computing apparatus 14 modifies and/or suppresses at least a portion of the content based on the treatment identified in the privacy information in step 204. In one example, the modification and/or suppression is determined by referring to the treatment stored in the memory 30 that is associated with the privacy level determined and assigned in step 206. In another example in which a privacy level is not explicitly determined and/or assigned, the vehicle computing apparatus 14 can analyze the privacy information and compare the privacy information to a table stored in the memory 30. In this example, the table is populated by a user of the vehicle computing apparatus 14 with treatments for content having certain specified characteristics, as described and illustrated earlier.

In step 218, the vehicle computing apparatus 14 outputs the modified content and/or any portion of the content not suppressed for output by the vehicle computing apparatus 14. If the vehicle computing apparatus 14 determines, in step 216, that the content is to be suppressed in its entirety, based on one or more characteristics of the content, the vehicle computing apparatus 14 can suppress the content and optionally store the content in memory 30 to be output at a later time. For example, suppressed content regarding an incoming call may not be relevant at a later time but content regarding a calendar appointment reminder may be relevant at a later time that is prior to the appointment. If the vehicle computing apparatus 14 stores the suppressed content, in one example, the vehicle computing apparatus 14 can automatically send the request at a later time based on any meaningful change(s) in the environmental data identified by periodically performing steps 206-214. In another example, the content can be available at a later time for manual retrieval. In this example, the vehicle computing apparatus 14 can notify a user that content received from the mobile computing device 12(1) has been suppressed and is available for retrieval.

If the vehicle computing apparatus 14 determines, in step 206, the threshold privacy level is not exceeded, in step 210, the number of occupants is not greater than one, or, in step 214, all of the identified occupants are authorized to view the content, the vehicle computing apparatus 14 proceeds to output the content, in step 220. Once the content is output, or during any of steps 204-220, the vehicle computing apparatus 14 can receive another request to output content in step 202.

Figure 3:
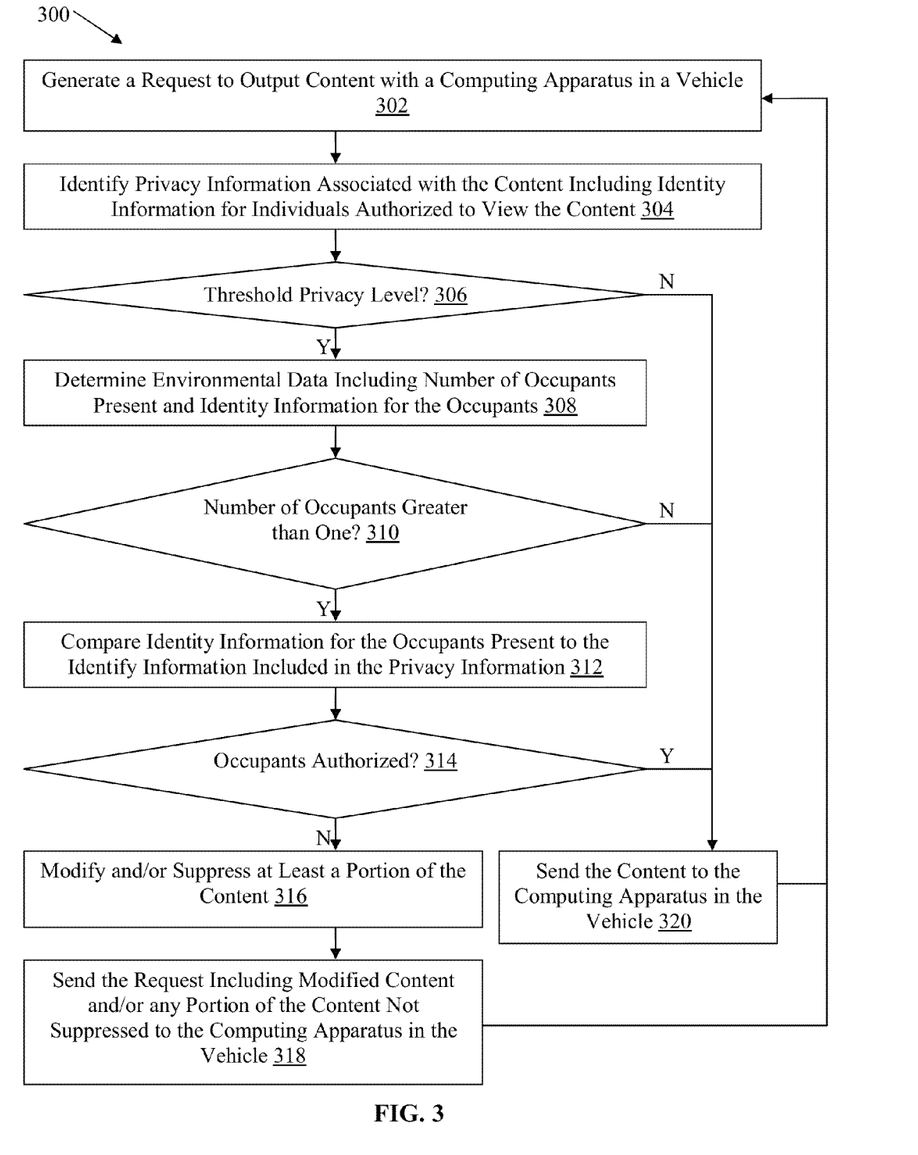
FIG. 3 is a flow chart of a method for modifying and/or suppressing content by a mobile computing device prior to sending a request to output the content to a vehicle computing apparatus.

A method 300 for modifying and/or suppressing content by a mobile computing device 12(1) prior to sending a request to output the content to a vehicle computing apparatus 14 will now be described with reference to FIGS. 1 and 3.

In step 302, the mobile computing device 12(1) generates a request to output content. The request can be generated automatically by a computer program operating on the mobile computing device 12(1) in response to an event. Generally, the request is serviced using a display or speaker(s) integral with the mobile computing device 12(1). However, based on one or more rules, the request can be serviced using resources of a third party device, such as the display 36 of the vehicle computing apparatus 14. A rule can require transmission of the request to output content to an external device connected by a communication network 16(1), such as an IEEE 802.15 network, based on the external device profile or identifier (e.g. "vehicle") communicated during an IEEE 802.15 pairing. Accordingly, in this example, the mobile computing device 12(1) generates a request to output content with the computing apparatus 14 in the vehicle 15 and selectively sends the request to the vehicle computing apparatus 14 as described below with respect to steps 318 and 320.

Prior to determining whether to send the request generated in step 302 to the vehicle computing apparatus 14, in step 304, the mobile computing device 12(1) identifies privacy information associated with the content included in the request. The privacy information can include user preference information for treatment of the content, with respect to transmission of the content for output by an external device, such as the vehicle computing apparatus 14, based on one or more characteristics of the content, as described earlier with respect to step 204. Optionally, the preference information and/or treatments can be input by the user through an interface output to a display of the mobile computing device 12(1) and stored in the memory 20(1), as described earlier with respect to the vehicle computing apparatus 14 display and interface in step 204. For example, the user can use the interface to store a treatment requiring suppression of all reminders for appointments indicated as "work-related" when established in a calendar computer program operating on the mobile computing device 12(1). The vehicle computing apparatus 14 can store the treatment(s) in a table in the memory 20(1) as associated with one or more characteristic(s) of the content.

In the method 300, the privacy information optionally includes identify information for individuals authorized to view the content. In this example, the names or unique identifiers of individual(s) authorized to view the content can be determined based on user preference information. The user preference information can be input using an interface and a display and stored by the mobile computing device 12(1), as described earlier with respect to use of an interface and the display 36 of the vehicle computing apparatus 14 in step 204.

In step 306, the mobile computing device 12(1) determines whether the privacy level exceeds a threshold privacy level indicating at least a portion of the content is private and requires modification or suppression. Based on the privacy information, or lack thereof, the mobile computing device 12(1) can determine and/or assign a privacy level associated with the content, as described and illustrated earlier with respect to step 206. If the mobile computing device 12(1) determines the privacy level exceeds a threshold level, the mobile computing device 12(1) proceeds to step 308.

In step 308, the mobile computing device determines environmental data including at least a number of occupants present in the vehicle 15. In one example, the number of occupants present in the vehicle 15 is determined based on a query to the vehicle computing apparatus 14 which can determine the environmental data as described and illustrated earlier with respect to step 208. In another example, the mobile computing device 12(1) can communicate with any other mobile computing device 12(n) coupled to the communication network 16(1). Accordingly, another mobile computing device 12(n) present in the vehicle 15 can be configured to emit a signal received by the network interface 22(1) of the mobile computing device 12(1) which can thereby determine that another occupant may be present in the vehicle. In the method 300, the environmental data optionally includes identity information for the occupants present in the vehicle 15 based on communication with other mobile computing devices 12(n) present in the vehicle 15 using the communication network 16(1), and/or an external network-accessible device, as described and illustrated earlier with respect to step 208.

In step 310, the mobile computing device 12(1) determines whether the number of occupants present in the vehicle 15 is greater than one based on the determined environmental data. If the number of occupants present in the vehicle 15 is greater than one, the mobile computing device 12(1) proceeds to step 312.

In step 312, the mobile computing device 12(1) optionally compares the occupant identity information included in the environmental data determined in step 308 to the identity information for the individuals authorized to view the content included in the privacy information identified in step 304.

Based on the comparison, in step 314, the mobile computing apparatus 12(1) determines whether the occupant(s) present in the vehicle 15 are authorized to view the content. If at least one of the occupant(s) present in the vehicle 15 is not authorized to view at least a portion of the content, the mobile computing device 12(1) proceeds to step 316.

Optionally, the mobile computing device 12(1) can proceed directly to step 316 from step 310 in examples in which identity information is not determined and/or included in the privacy information and/or occupant identity information is not determined and/or included in the environmental data. Additionally, the vehicle computing apparatus 14 can proceed directly to step 316 from step 310 in examples in which a privacy level is assigned indicating that at least a portion of the content is private such that no other individuals are authorized to view the content.

In step 316, the mobile computing device 12(1) modifies and/or suppresses at least a portion of the content based on the treatment identified in the privacy information in step 304. In one example, the modification and/or suppression is determined by referring to the treatment stored in the memory 20(1) that is associated with the privacy level determined and assigned in step 306. In another example in which a privacy level is not explicitly determined and/or assigned, the mobile computing device 12(1) can analyze the privacy information and compare the privacy information to a table stored in the memory 20(1). In this example, the table is populated by a user of the mobile computing device 12(1) with treatments for content having certain specified characteristics, as described and illustrated earlier.

In step 318, the mobile computing device 12(1) sends the request including the modified content and/or any portion of the content not suppressed to the vehicle computing apparatus 14 for output. If the mobile computing device 12(1) determines, in step 316, that the request is to be suppressed in its entirety, based on one or more characteristics of the content included in the request, the mobile computing device 12(1) can suppress the request and optionally store the request and/or content in memory 30 to be sent to the vehicle computing apparatus 14 for output at a later time. If the mobile computing device 12(1) stores the suppressed content, in one example, the mobile computing device 12(1) can automatically send the request at a later time based on any meaningful change(s) in the environmental data identified by periodically performing steps 206-214.

If the mobile computing device 12(1) determines, in step 306, the threshold privacy level is not exceeded, in step 310, the number of occupants is not greater than one, or, in step 314, all of the identified occupants are authorized to view the content, the mobile computing device 12(1) proceeds to send the request generated in step 302 to the vehicle computing apparatus 14. Once the request is sent, or during any of steps 304-320, the vehicle computing apparatus 14 can receive another request to output content in step 302.

Accordingly, as illustrated and described with reference to the examples herein, this technology provides a number of advantages including the ability to prevent unwanted dissemination of content to other occupants of a captive environment, such as a vehicle, with a computing apparatus including a display visible by all of the occupants of the environment or speaker(s) configured to emit audio that is accessible by all of the occupants of the environment. By determining privacy information including a treatment of the content based on characteristic(s) of the content and environmental data including the number of occupants in the vehicle, a mobile computing device and/or a vehicle computing apparatus can modify and/or suppress portion(s) of the content prior to sending the content to the vehicle computing apparatus or outputting the content with the vehicle computing apparatus, respectively.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
   receiving, by a computing apparatus in a vehicle and from a mobile computing device present in the vehicle, a request to output content to a display of the computing apparatus;
   identifying, by the computing apparatus, privacy information associated with the content;
   determining, by the computing apparatus, environmental data associated with the vehicle, the environmental data comprising at least a number of occupants present in the vehicle;
   modifying, by the computing apparatus, based on the privacy information and the environmental data, the content; and
   outputting, by the computing apparatus, the modified content to the display of the computing apparatus.

2. The method of claim 1, wherein the modifying further comprises:
   removing at least a portion of the content in response to the privacy information indicating a threshold level of privacy and the environmental data indicating that the number of occupants present in the vehicle is greater than one.

3. The method of claim 1, wherein the modifying further comprises:
   anonymizing at least a portion of the content in response to the privacy information indicating a threshold level of privacy and the environmental data indicating that the number of occupants present in the vehicle is greater than one.

4. The method of claim 1, further comprising:
   determining, by the computing apparatus, the number of occupants present in the vehicle based on data output by at least one occupancy sensor of the vehicle.

5. The method of claim 1, wherein:
   the determining further comprises obtaining, from an electronic device associated with the at least one occupant present in the vehicle, identity information for the at least one occupant present in the vehicle; and
   the environmental data further comprises the identity information for the at least one occupant present in the vehicle.

6. The method of claim 5, wherein the privacy information further comprises identity information of one or more individuals not authorized to view the content and the method further comprises:
   determining, by the computing apparatus, whether the identity information of the one or more individuals matches the identity information for the at least one occupant present in the vehicle; and suppressing, by the computing apparatus, the content when it is determined that the identity information of the one or more individuals matches the identity information for the at least one occupant present in the vehicle.

7. A computer readable storage device storing instructions comprising machine executable code which when executed by at least one processor, causes the processor to perform steps comprising:

receiving, from a mobile computing device present in a vehicle, a request to output content to a display;

identifying privacy information associated with the content;

determining environmental data associated with the vehicle, the environmental data comprising at least a number of occupants present in the vehicle; and suppressing, based on the privacy information and the environmental data, at least a portion of the content.

8. The device of claim 7, wherein the suppressing further comprises:

removing at least a portion of the content in response to the privacy information indicating a threshold level of privacy and the environmental data indicating that the number of occupants present in the vehicle is greater than one.

9. The device of claim 7, wherein the suppressing further comprises:

anonymizing at least a portion of the content in response to the privacy information indicating a threshold level of privacy and the environmental data indicating that the number of occupants present in the vehicle is greater than one.

10. The device of claim 7, wherein the instructions comprise machine executable code which when executed by the at least one processor, causes the process to perform steps further comprising:

determining the number of occupants present in the vehicle based on data output by at least one occupancy sensor of the vehicle.

11. The device of claim 7, wherein:

the determining further comprises obtaining, from an electronic device associated with the at least one occupant present in the vehicle, identity information for the at least one occupant present in the vehicle; and the environmental data further comprises the identity information for the at least one occupant present in the vehicle.

12. The device of claim 11, wherein the privacy information further comprises identity information of one or more individuals not authorized to view the content and the instructions comprise machine executable code which when executed by the at least one processor, causes the process to perform steps further comprising:

determining whether the identity information of the one or more individuals matches the identity information for the at least one occupant present in the vehicle; and suppressing all portions of the content when it is determined that the identity information of the one or more individuals matches the identity information for the at least one occupant present in the vehicle.

13. The device of claim 7, wherein the instructions comprise machine executable code which when executed by the at least one processor, causes the process to perform steps further comprising:

storing the requested content in a memory such that the content is automatically output or manually available at a later time.

14. A method, comprising:

generating, by a mobile computing device present in a vehicle, a request to output content with a display of a computing apparatus in the vehicle;

identifying, by the mobile computing device, privacy information associated with the content;

determining, by the mobile computing device, environmental data associated with the vehicle, the environmental data comprising at least a number of occupants present in the vehicle;

modifying, by the mobile computing device, based on the privacy information and the environmental data, the content; and sending, with the mobile computing device, the request including the modified content to the computing apparatus in the vehicle.

15. The method of claim 14, wherein the modifying further comprises:

removing at least a portion of the content in response to the privacy information indicating a threshold level of privacy and the environmental data indicating that the number of occupants present in the vehicle is greater than one.

16. The method of claim 14, wherein the modifying further comprises:

anonymizing at least a portion of the content in response to the privacy information indicating a threshold level of privacy and the environmental data indicating that the number of occupants present in the vehicle is greater than one.

17. The method of claim 14, wherein the determining environmental data further comprises:

retrieving the environmental data from the computing apparatus in the vehicle.

18. The method of claim 14, wherein:

the determining further comprises obtaining, from an electronic device associated with the at least one occupant present in the vehicle, identity information for the at least one occupant present in the vehicle; and the environmental data further comprises the identity information for the at least one occupant present in the vehicle.

19. The method of claim 18, wherein the privacy information further comprises identity information of one or more individuals not authorized to view the content and the method further comprises:

determining, by the mobile computing device, whether the identity information of the one or more individuals matches the identity information for the at least one occupant present in the vehicle; and suppressing, by the mobile computing device, the content when it is determined that the identity information of the one or more individuals matches the identity information for the at least one occupant present in the vehicle.

20. An mobile computing device, comprising:

a processor coupled to a memory and configured to execute programmed instructions stored in the memory comprising:

generating when the mobile computing device is present in a vehicle, a request to output content with a display of a computing apparatus in the vehicle;

identifying privacy information associated with the content;

determining environmental data associated with the vehicle, the environmental data comprising at least a number of occupants present in the vehicle;

suppressing, based on the privacy information and the environmental data, at least a portion of the content; and sending the request including any portion of the content not suppressed to the computing apparatus in the vehicle.

21. The mobile computing device of claim 20, wherein the suppressing further comprises:

removing at least a portion of the content in response to the privacy information indicating a threshold level of privacy and the environmental data indicating that the number of occupants present in the vehicle is greater than one.

22. The mobile computing device of claim 20, wherein the suppressing further comprises:

anonymizing at least a portion of the content in response to the privacy information indicating a threshold level of privacy and the environmental data indicating that the number of occupants present in the vehicle is greater than one.

23. The mobile computing device of claim 20, wherein the determining environmental data further comprises:

retrieving the environmental data from the computing apparatus in the vehicle.

24. The mobile computing device of claim 20, wherein:

the determining further comprises obtaining, from an electronic device associated with the at least one occupant present in the vehicle, identity information for the at least one occupant present in the vehicle; and the environmental data further comprises the identity information for the at least one occupant present in the vehicle.

25. The mobile computing device of claim 24, wherein the privacy information further comprises identity information of one or more individuals not authorized to view the content and the processor coupled to the memory is further configured to execute programmed instructions stored in the memory further comprising:

determining whether the identity information of the one or more individuals matches the identity information for the at least one occupant present in the vehicle; and suppressing all portions of the content when it is determined that the identity information of the one or more individuals matches the identity information for the at least one occupant present in the vehicle.

26. The mobile computing device of claim 20, wherein the suppressing further comprises:

suppressing all portions of the content; and storing the request in a memory such that the request is automatically sent to the computing apparatus in the vehicle at a later time.

* * * * *